United States Patent [19]

Moore et al.

[11] 3,976,999
[45] Aug. 24, 1976

[54] AIRBORNE TARGET RECOGNITION SYSTEM

[75] Inventors: Thomas A. Moore, Locust Grove; Earl Gehman, Fairfax; George Huddleston, Herndon, all of Va.

[73] Assignee: Vega Precision Laboratories, Inc., Vienna, Va.

[22] Filed: Oct. 19, 1973

[21] Appl. No.: 407,892

[52] U.S. Cl. .................................. 343/7.3; 343/7.4
[51] Int. Cl.² .......................................... G01S 9/16
[58] Field of Search ..................... 343/7.3, 7.4, 18 E

[56] References Cited
UNITED STATES PATENTS

| | | | |
|---|---|---|---|
| 3,419,867 | 12/1968 | Pifer | 343/7.4 X |
| 3,445,663 | 5/1969 | Jones et al. | 343/7.4 X |
| 3,522,604 | 8/1970 | Gillmer et al. | 343/7.3 |
| 3,805,267 | 4/1974 | Gerard | 343/7.3 |

*Primary Examiner*—T.H. Tubbesing
*Attorney, Agent, or Firm*—Schuyler, Birch, Swindler, McKie & Beckett

[57] ABSTRACT

In a radar target acquisition system means are provided for analyzing the video return including an automatic gate circuit causing the range gate to sweep out, and to sequentially sample the video return; a filter acquisition video processing circuit including means for discriminating between random and sinusoidal amplitude modulation appearing on the video return and having known frequency characteristics equal to the scan and pulse repetition frequencies of the radar within the pass band of the filter circuit, and means for comparing the discriminated amplitude modulated video return signal to at least one established threshold; and a track circuit which remains de-activated during the sweeping mode and is activated upon command from the filter acquisition circuit. Means are provided for manually initiating the gate circuit and for inhibiting the track circuit to await response from the filter acquisition circuit.

13 Claims, 8 Drawing Figures

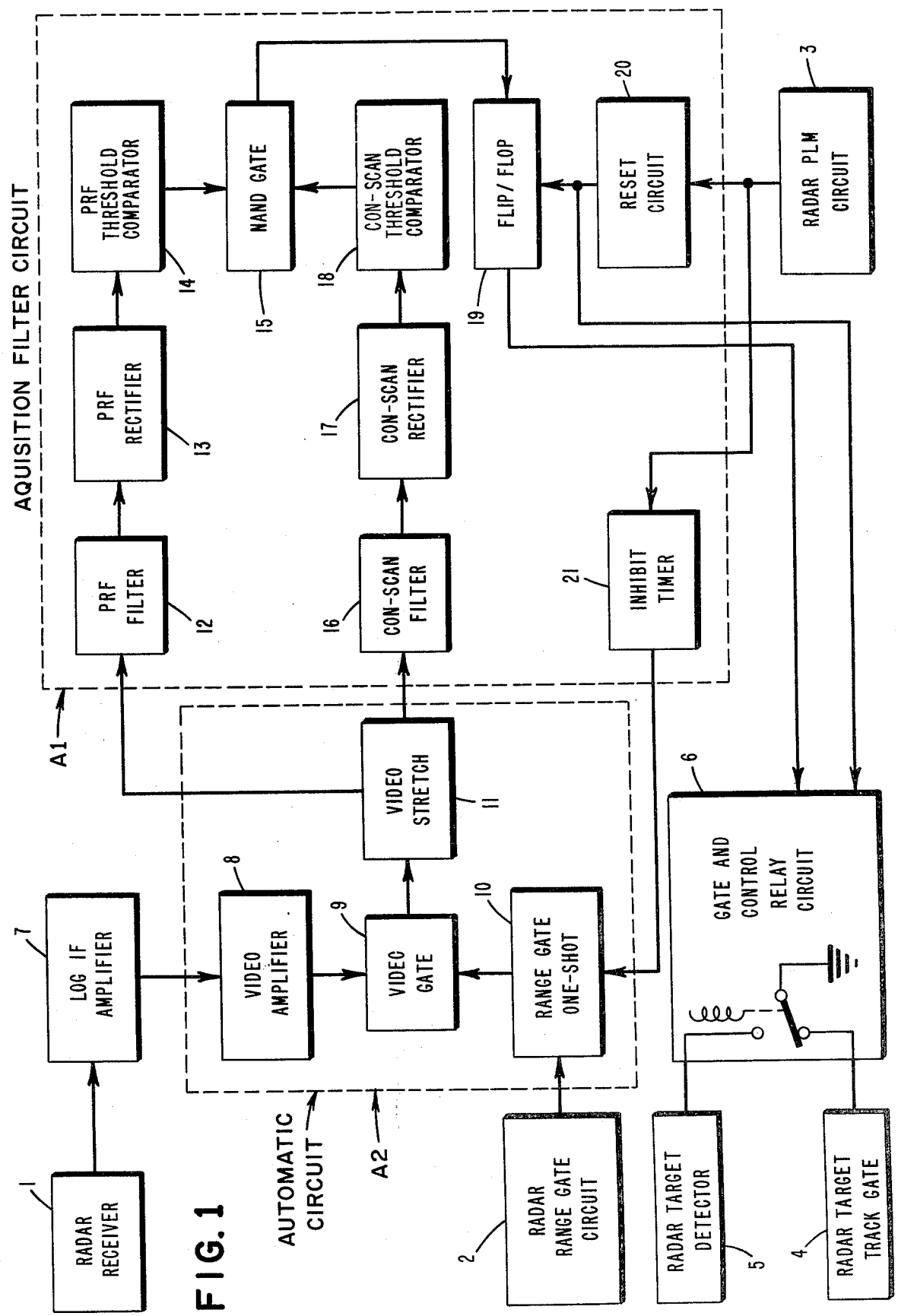

AIRBORNE TARGET RECOGNITION SYSTEM

FIELD OF THE INVENTION

This invention relates to the field of radar apparatus and more particularly to a device for providing automatic target acquisition and lock-on based on amplitude modulated information in the radar return signal.

BACKGROUND OF THE INVENTION

In using radar for fire control and missile weapon launch purposes, detection and tracking of airborne targets in the presence of surface clutter is required. This surface clutter constitutes the radar reflections from the surface of the earth which constitutes a part of the video return through either the main beam of the antenna or its side lobes; this return (known as the altitude line) is often so strong that weaker reflections from smaller airborne targets are completely masked.

Pulse doppler radars have been developed which solve a portion of this problem. They overcome the serious masking by recognizing the doppler effect on the radar return caused by the variation of the relative radial velocity between the aircraft and the target and the aircraft and the earth surface.

Thus the reflections have specific frequencies that may be separated out by means of a comb filter or other suitable detector coupled to the radar return analysis circuitry. However, this technique does not solve the entire problem. In particular, the mode of operation wherein automatic acquisition and tracking of the airborne target is to be provided, cannot be accomplished with this system without prior knowledge of the specific target doppler frequency at the moment of acquisition. Without this knowledge, the sweeping range gate would ignore the target. If, on the other hand, a pulse radar attempts to automatically acquire a target, the range gate will lock up the first video return that it encounters as it sweeps out in range and thus often locks onto a false information return. It is therefore the object of this invention to provide a radar with an inherent ability to recognize and discriminate between an airborne target and the surface clutter whether the clutter is masking the target or is picked up by the antenna side lobes. It is also the object of this present invention to provide discrimination during an automatic acquisition mode wherein the range gate automatically sweeps out in range and locks onto the airborne target.

The present invention puts to use the amplitude modulation appearing on the target video return during the period of time the conical scan broadcast by the radar antenna dwells on the airborne target. This modulation results from the positioning of the target relative to the movement of the conical scan sometimes referred to as "nutation of the feed horn" as it illuminates the target. Systems are known wherein the conical scan feature is employed in angle tracking circuits to cause the angle servos to drive the antenna in an appropriate direction to place the target in the center of the nutating beam. Examplary circuits are disclosed in the following U.S. Pat. Nos.: Slusser 2,776,422; Sommers 3,082,415; McCoy 3,206,753; Schmutz et al 3,231,759; Adams, 3,307,183; Jones et al 3,445,663; and Waters 3,588,989. For example, the U.S. Pat. No. 3,307,183 to Adams discloses a conical scan radar system which may be operated either in the pulse or CW modes; the purpose of the invention is to provide a means for avoiding jamming by external sources. The amplitude modulated return is used for range tracking by comparison against a reference sine wave in order to arrive at a correction signal to center the target in the center of the conical scanning beam. But no disclosure is made in this patent of use of the amplitude modulated return to discriminate between the target video information and ground clutter return. U.S. Pat. No. 3,231,759 to Schmutz et al discloses a pulse radar system wherein the received signal is amplitude modulated unless the target is on the axis of symetry of the transmitted beam. In this circuit, a control voltage is generated from the modulated echo for operating the automatic tracking system and again centering the target. U.S. Pat. No. 3,083,415 to Sommers discloses a target acquisition system wherein the conically scanned beam acts in conjunction with a gate which locks the radar onto the target as bearing elevation and range vary. None of these patents or the other patents cited above discloses use of the amplitude modulated return signal for discrimination of target information from ground clutter to enable a track gate to identify and lock on to the target. This invention has the unique ability not disclosed in the prior art of utilizing the amplitude modulated return information to discriminate between an airborne target and surface clutter, to thereby discover targets flying low against the surface of the earth and enable the gated circuitry to initially lock onto and remain onto the target to be tracked.

SUMMARY OF THE INVENTION

The objective of this invention is to provide an automatic target acquisition and lock-on device whereby an airborne target is recognized or discriminated from ground return so that pilot selection of sweep direction is eliminated. Utilizing this device, the pilot is no longer concerned that if he selects a wrong direction, depending on target versus altitude distances, that the radar range strobe will encounter and lock onto the altitude line. Utilizing the acquisition system of this invention, the range strobe will not stop on the altitude line but will continue on until the airborne target is detected. The altitude line is rejected and the airborne target automatically acquired and tracked for speed or firing data.

It is an object of this invention to utilize the amplitude modulation as the criteria for distinguishing video return from an airborne target from ground clutter return and locking the range gate onto the detected target. In an alternative and also highly useful embodiment it is a further object of the invention to provide an air-to-air semi-active missile with an inherent ability to position and track its speed gate when it has been deprived of specific data by the parent fire control radar and to accomplish this function prior to or after launch.

It is another object of the invention to accomplish the desired lock-on and track function is a high clutter environment when the target is masked by high sea state return or return from mountainous terrain.

It is another object of the invention to provide an automatic recycle to cause the search function of the gate circuitry to search out the amplitude modulated target return in the event gate track is lost and thus prevent the missile from adapting a balistic course and to home in on a strong random signal. The conical scan radar with which this invention is employed utilizes a highly directive antenna which concentrates an area of illumination in a spot search light or collimated beam.

This beam is caused to nutate and as the beam illuminates the target, the target being contained within the beam, the signal strength of the radar reflections is proportional to the centroid of the illumination. In other words if the nutating beam is so directed that the target is at the exact center of the nutation all reflections from the target would be equal strength and no modulation would appear. However, in a dynamic environment the airborne target is constantly in motion and as such the departure from center produces a desired modulation. Means are provided for analyzing the video return including an automatic gate circuit causing the range gate to sweep out, and to sequentially sample the video return; a filter acquisition video processing circuit including means for discriminating between random and sinusoidal amplitude modulation appearing on the video return and having known frequency characteristics equal to the scan and pluse repetition frequencies of the radar within the pass band of the filter circuit, and means for comparing the discriminated amplitude modulated video return signal to at least one established threshold; and a track circuit which remains de-activated during the sweep mode and is activated upon command from the filter acquisition circuit. In the preferred embodiment, means are provided for manually initiating the automatic gate circuit and for inhibiting the track circuit to await response from the filter acquisition circuit.

BRIEF DESCRIPTION OF THE DRAWINGS

A preferred embodiment of the invention is described with respect to the accompanying drawings wherein:

FIG. 1 is a block diagram of the airborne automatic target acquisition and lock-on system shown in conjunction with a necessary cooperating elements of a standard radar system with which it is used;

DETAILED DESCRIPTION OF PREFERRED EMBODIMENT

Figure 3C:
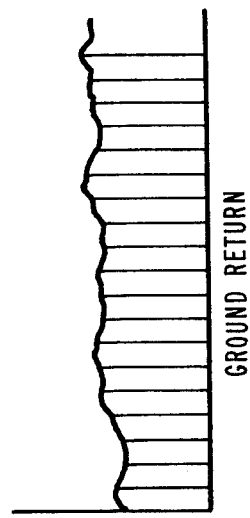
FIGS. 3a–3c illustrate the mode of operation of a conical sweep radar employing the acquisition circuitry of this invention.
Figure 3B:
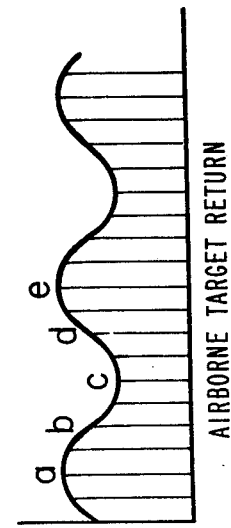
Figure 3A:
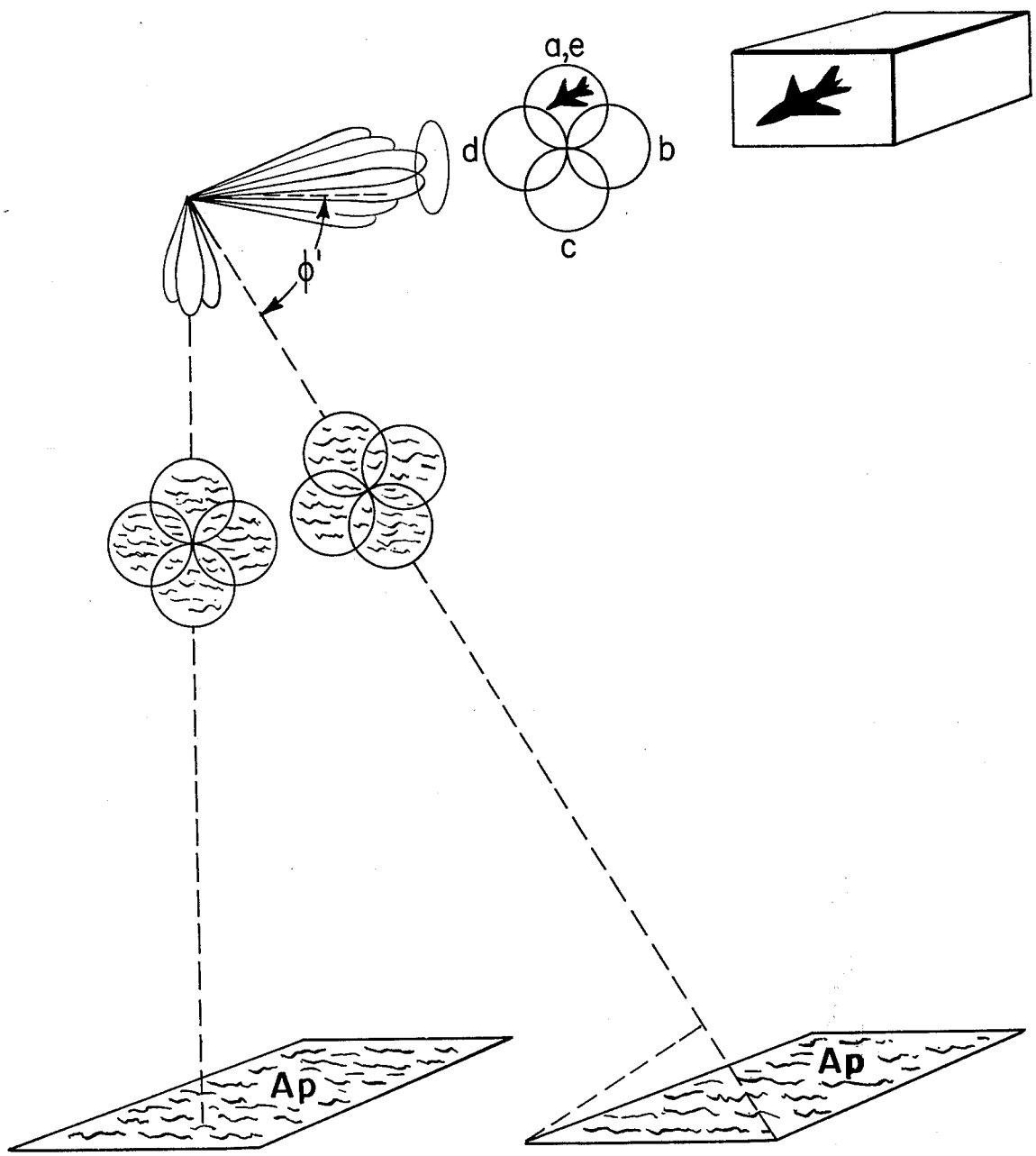

The described radar acquisition circuit receives and analyses the amplitude modulation which is a part of the video return from an airborne target that is not present in surface return. The described preferred embodiment of the radar acquisition circuit is utilized in combination with a conical scan radar such as is well known in the art employing a highly directive antenna which concentrates the area of illumination in a searchlight or collimated beam. Normally, this beam of illumination is approximately 2–3 degrees wide at the three db points. This narrow beam is caused to nutate until the beam illuminates the target of which recognition is sought. The described device operates best if the target is small enough or the beam wide enough to completely be contained within the beam cone traced out by the scanning antenna. Upon illumination of the target, the signal strength of the radar reflections are proportional to the centroid of the illumination. If the nutating beam is so directed that the target is at the exact center of nutation, all reflections from the target would be of equal strength and no modulation would appear. However, in the dynamic environment in which this invention is utilized, the airborne target is constantly in motion; the resulting departure from center produces the desired modulation which is detected by the filter circuitry disclosed in this invention. The greater the departure from exact center, the greater the percentage of the modulation. Referring to FIG. 1, when it is desired to acquire and lock onto a target, the pilot puts the radar into the PLM mode or target acquisition mode. The pilot has visual acquisition of the target and he is pointing the conical radar beam in the correct direction to acquire the target. Acquisition is initiated by a manually actuated radar PLM circuit 3, which is controllably coupled to gate control and relay circuit 6 and inhibit timer 21. Gate control 6 is energized to turn off the radar target detector circuitry 5 (which is not a part of the invention) and lock out the radar target track gate 4. In the acquisition mode, the function of the radar target detector 5 is to decide whether the pulses received during a range gate interval arise from a valid target. If so, track is initiated. In the track mode, the function of the radar target track gate or range track circuitry 4 is to track a selected target in range to provide a voltage which is a measure of target range, and supply gate and range strobes to other parts of the radar. Range gate circuitry produces a gate that passes only those pulses that are received by the radar at a specific delay time following transmission of the radar pulse. In the target acquisition mode, the delay time is varied from a valve near zero to a valve that corresponds to maximum range. The track gate is thereby prevented from locking onto the target during acquisition. The target track gate 4 must be locked out because the radar receives video return from the altitude line as well as from the target. Thus as the range gate sweeps out – and in this preferred embodiment it is an amplitude sensitive range gate although these principles may be applied with appropriate modification to speed gate lock on – it would sense the first video return signal and lock on. If the range gate is going out, and the ground reflected signal returns before the aircraft reflected signal, the ground target is picked up first and not the airborne target, the radar will lock up on ground clutter and is denied the target. This difficulty is overcome by insertion of the target acquisition circuitry of this invention, which requires that before theh track gate 4 can lockk onto the target, a reset signal must be provided from the invented acquisition filter circuit A1 to the gate and control relay circuit 6, turning on the target detector 5 and turning on the target track gate 4. The required signal output from acquisition filter A1 exists when an amplitude modulated signal of sufficient amplitude exists at some point during range sweep to establish that video return from a moving target rather than the earth's surface is being received. The difference in amplitude modulation of the frequency signals of interest is illustrated at FIGS. 3A – 3C. FIG. 3A illustrates a typical conical scanning beam wherein the main lobes are directed to an airborne target, while the side lobes develop ground clutter or "altitude line." If the ground clutter returns sooner than the signal from the target to be tracked, then in a conventional radar without the described target recognition system as the range gate moves out it locks on the first return signal, i.e., the ground return. The invented target recognition system takes advantage of the previously unutilized fact that the return from the target as the conical beam is nutated thereover is an amplitude modulated sinusoidal signal (see FIG. 3B) whose peaks correspond to the target being entirely within the conical envelope (compare peaks $a$, $e$ of FIG. 3B with conical sweep positions $a$, $e$ of FIG. 3A) and whose valleys $c$ correspond to the conical radar sweep return position containing no video return from the target. In contrast, as the scanning antenna beam rotates about ground, the terrain encountered creates little amplitude modulation at regular frequency, by only random modulations (see FIG. 3A and the corresponding return signal of FIG. 3C). Two signals of known frequency carry sufficient amplitude modulation upon reflection from a moving target within the concial beam of the cone to be accurately detected and utilized to establish the target acquisition signal; one is the conical scan frequency, i.e., the frequency at which the cone shaped beam is nutated over the target area; this conical scan frequency is nominally about 70 Hz. There is also a cyclic variation in the degree of amplitude modulation of the video return with respect to the pulse repetition frequency (prf) rate of the signal. This is the frequency at which pulses are sent out to locate a target; this frequency is nominally about 1000 Hz.

The inventors herein have discovered that this amplitude modulated sinusoid signal (relative to the conical scan rate or the prf rate, preferably the former) can be detected and compared to a predetermined threshold to establish that the target is within the conical scan and is within the range sweep and thus lock the track gate on the target. Discrimination against ground return is provided by virtue of the fact that the ground return cannot regularly exceed the established threshold.

Essentially the device utilizes an automatic gate circuit A2 to sweep out over the range and gate the video return into acquisition filter A1 to determine when video from the target is being received, at which time radar track gate 4 ils locked on the target. The automatic gate circuit A2 is normally inhibited by inhibit timer 21; its operation is initiated by the manual mode switch 3, turning on range gate one shot 10; thereafter, the normal tracking gate pulses provided by radar range gate circuit 2 are expanded in a range gate one shot circuit 10 to define a period within which video return is gated to the filter acquisition circuit A1, and thus define an envelope within which the amplitude modulated video return must exceed a predetermined threshold. As discussed above, when PLM circuit switch 3 is activated, turning on the automatic gate A2, this locks out track gate 4 through gate control relay 6, and deactivates detector 5. When acquisition is completed, as indicated by detection of a signal of greater than threshold value in the acquisition filter circuit A1, then the relay 6 is triggered to return to its original position, via control flip-flop 19, turning on the detection circuitry 5 and enabling the track gate 4 to lock on target.

To establish that the video return contains amplitude modulation characteristics produced by movement of the target through the nutating scan beam and not by ground clutter, the video return from receiver 1 is fed to amplifier circuit 7, then a gate circuit A2 which defines the envelope within which the return is gated to the acquisition filter A1; this acquisition circuit filters and compares the signal to a threshold and develops an acquisition control relay return signal to relay 6 if a properly modulated target video signal is received.

Specifically, the video return is applied first to a log IF amplifier 7 to preserve the amplitude modulation characteristics of the signal and obtain the maximum signal-to-noise ratio. This signal is amplified and detected with video amplifier 88 and applied through video gate 9 to video stretch circuit 11. The video gate 9 is opened in response to a gate signal from range gate one shot 10 which is inhibited until the target acquisition mode is activated and thereafter generates a wide range gate signal which effectively straddles, and is substantially longer than the normal radar range gate pulse from conventional gate circuit 2. For comparison, the normal range gate pulse is about 1.5 $\mu$ sec; this output of the acquisition range gate may be 2–8 $\mu$ sec. By this expanded gate, if the target is moving in or out of the scan it is sensed by the filter acquisition circuitry before the normal acquisition gate would acquire the target. As the filter acquisition circuit A1 senses, in advance, the target coming into the acquisition gate, it provides the reset signal to control relay 6 to return the radar target track gate 4 to normal operation and enable it to lock on the target.

The detected output of video amplifier 6 is gated into video stretch 11 which is an integrated type of circuit which stretches out the pulse so that it can be readily operated on by the filter acquisition circuit A1.

To establish the presence of the amplitude modulation signals which distinguish target return from ground return, the input to the acquisition filter circuit A1 is preferably applied to a conical scan filter 16 wherein signals at the conical scan frequency are filtered out by a band pass filter, rectified in conical scan rectifier 17 into a continuous wave voltage, and this voltage compared by con-scan comparator 18 to an established threshold level. The band pass of the filter is preferably established at 52-68 cycles, thereby passing signals at the conical scan frequency which is about 60 cycles. If a target appears within the conical scanning beam of the radar device, the resulting sinusoidal amplitude modulation of the video return signal is sufficient to exceed the threshold established to comparator 18. The comparator picks out the target over the ground return because, as explained with respect to FIG. 3C, the effects of ground return are so scattered that the voltage level of the ground return signal is simply not of sufficient magnitude on a continuing basis to overcome the established threshold. Operation of the disclosed preferred embodiment including filtering of the conical scan frequency provides an improvement of target return over ground return on the order of 17*db*. The resulting output is applied through reset circuit 20 to rset flip-flop 19 to return gate relay circuit 6 to its normal position and energizes the radar target track gate 4. Operation of this gate control relay 6 completes the operation of the invention by its establishment of recognition of the amplitude modulation characteristics peculiar to an airborne target is compared to the return from a target such as the earth's surface.

As an additional measure of security in a severe counter-measures enviroment, the detection and comparision of the amplitude modulation characteristics of the video return signal as its own pulse repetition frequency may be used. This would overcome a counter-measures technique which attempted to pull the radar antenna off the target by returning a false conical scan frequency. This added feature utilizes a prf filter 12 having a pass band broad enough to accomodate the prf of the radar; a rectifier 13; and a prf comparator 14 which compares the received sinusoidal amplitude modulated signal with a known threshold to establish target presence within the scan beam and coming into the range gate. A positive acquisition signal is applied in conjunction with an appropriate output from conical scan comparator 18 through NAND-gate 15 to reset the flip-flop 19, putting relay 6 in the mode whereby the radar track gate may lock on the target.

Figure 2A:
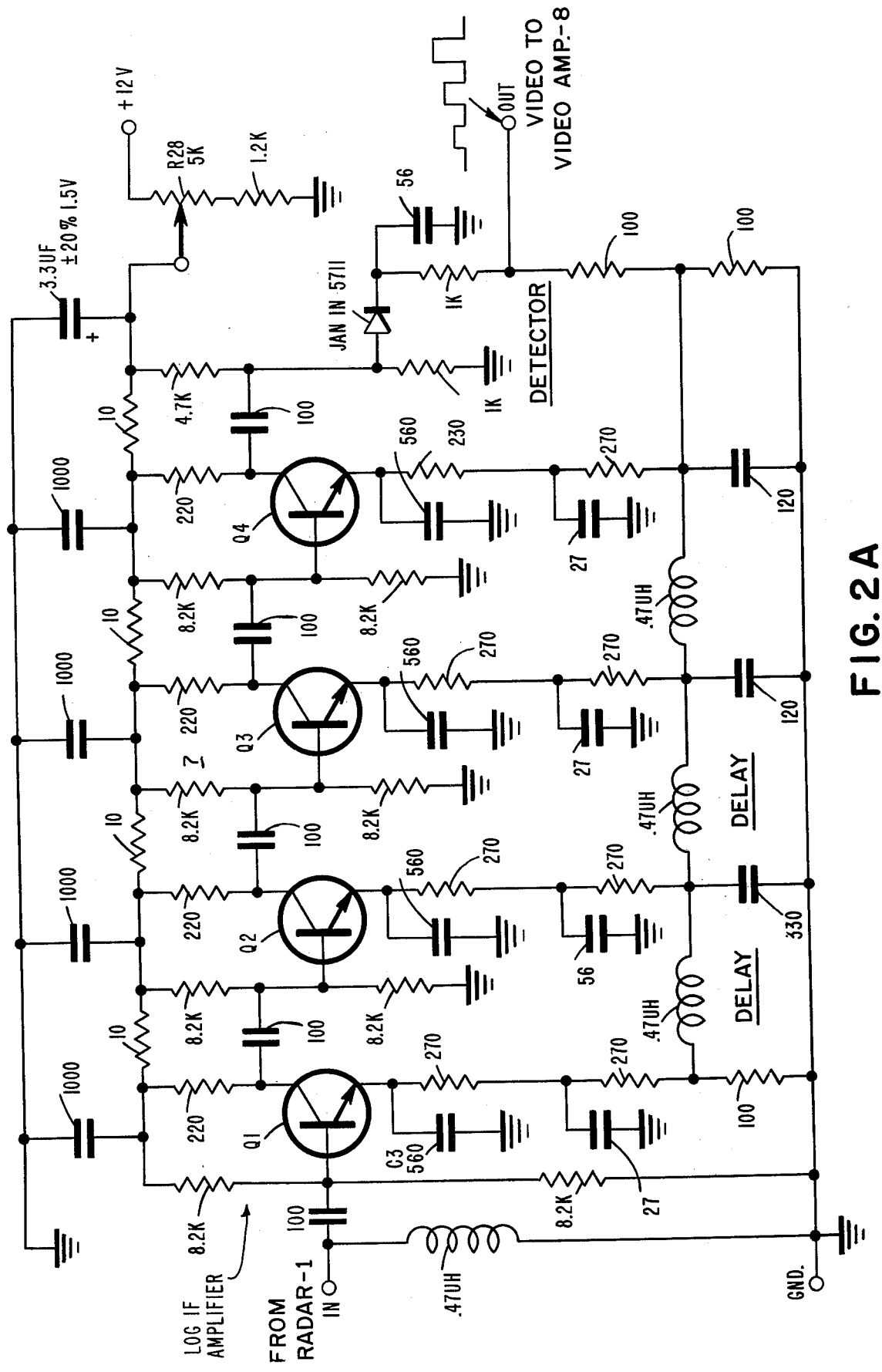
FIGS. 2a–2d
are a detailed schematic of the circuitry incorporated in the circuits utilized to provide the automatic target acquisition and lock-on function shown in block diagram form in FIG. 1.

The following circuits were specifically developed for use in the described target acquisition discriminator system. The other circuits shown in block form in the FIG. 1 are standard components of known radar systems, with which this device may be interfaced by techniques well known to those skilled in the art, and such elements are not further described herein. IF Amplifier 7 The Log IF Amplifier FIG. 2A provides a linear video output voltage proportional to the power input. This preserves the modulation of the video pulse over a dynamic range of 50 dB.

The Amplifier consists of four identical cascaded stages Q1–Q4. Each stage is an emitter tuned 2N918 transistor, which is tuned to the desired operating frequency by series resonating the apparent inductance in the base to emitter junction with a capacitor.

The Log Video action is accomplished by an emitter summing technique. A delay line is used between each stage to compensate for the delay of each transistor stage. A conventional diode video detector is used on the output stage. The output of this detector is added to the input of the video delay line and is connected to the input of the video amplifier. The gain is adjustable (R28) from 20 to 60 dB.

Video Amplifier 8 The Video Amplifier (FIG. 2B) is a two-stage linear amplifier Q101, 102 designed to amplify a positive input video pulse. Dynamic range without compression is 20 dB. Each stage uses a 2N918 transistor. The first stage is biased so that the collector to emitter voltage is 8 volts. The second stage bias sets the collector to emitter voltage at 3 volts.

The amplifier is designed for a video bandwith of 10 MHz, Rise Time is 35 nanoseconds. The overshoot is less than 5% and pulse droop for a 10 microsecond pulse is less than 10%.

Video Gate 9 The output of the Video Amplifier is connected through C4 to the video gate, consisting of R11, Q103 and Q104. Transistor Q103 is normally biased on. This short circuits the Video Signal to ground. Transistor Q104 is an inverting amplifier to drive Q103. Drive Q103 is from the range gate one-shot 10.

Figure 2B:
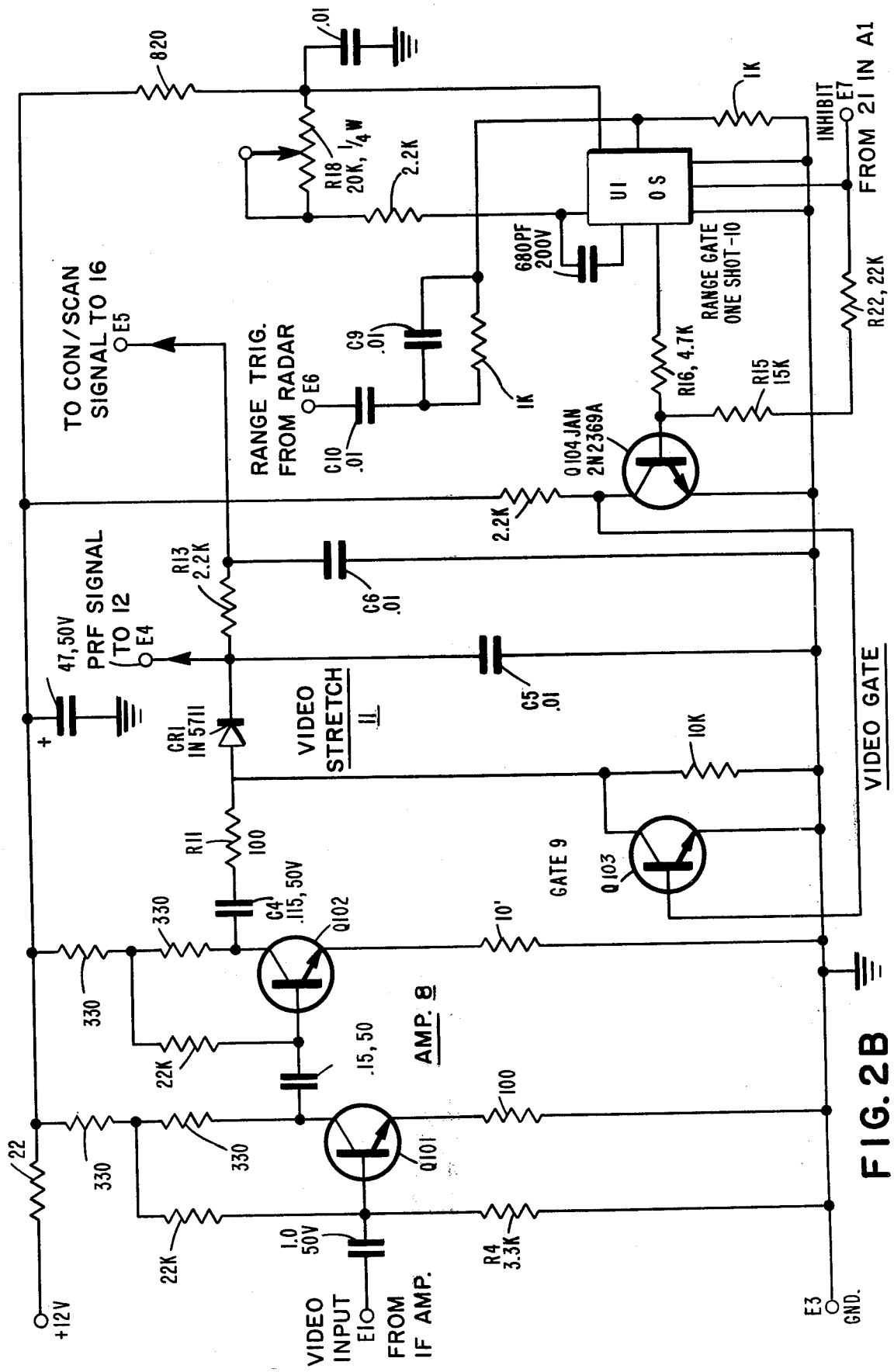

Range Gate One-Shot 10 Microcircuit U1, a monostable multivibrator is the Range Gate Timer (FIG. 2B). It is synchronously triggered with the Radar Range Gate. The one-shot is adjustable with R18 from 2 to 8 microseconds. This is equivalent to approximately 250 to 1000 yards of Radar Range and allows the discriminator circuitry time to analyze the return Radar Pulse before interception by the Radar Range Gate. When the one-shot is triggered, Q104 is biased ON and Q103 is biased OFF allowing the Video Pulses to be fed through CR1 to the Video Stretch Circuit 11.

Video Stretch 11 The Stretch Circuit 11 (FIG. 2B) is a double integrator consisting of a Diode CR1, R13, C5 and C6. The diode provides a low impedance charge path for C5. The stretch pulse appearing across C5 is fed to both the PRF filter 12 and through R13 to the conical scan stretch capacitor C6.

Acquisition Filter Circuit

Figure 2C:
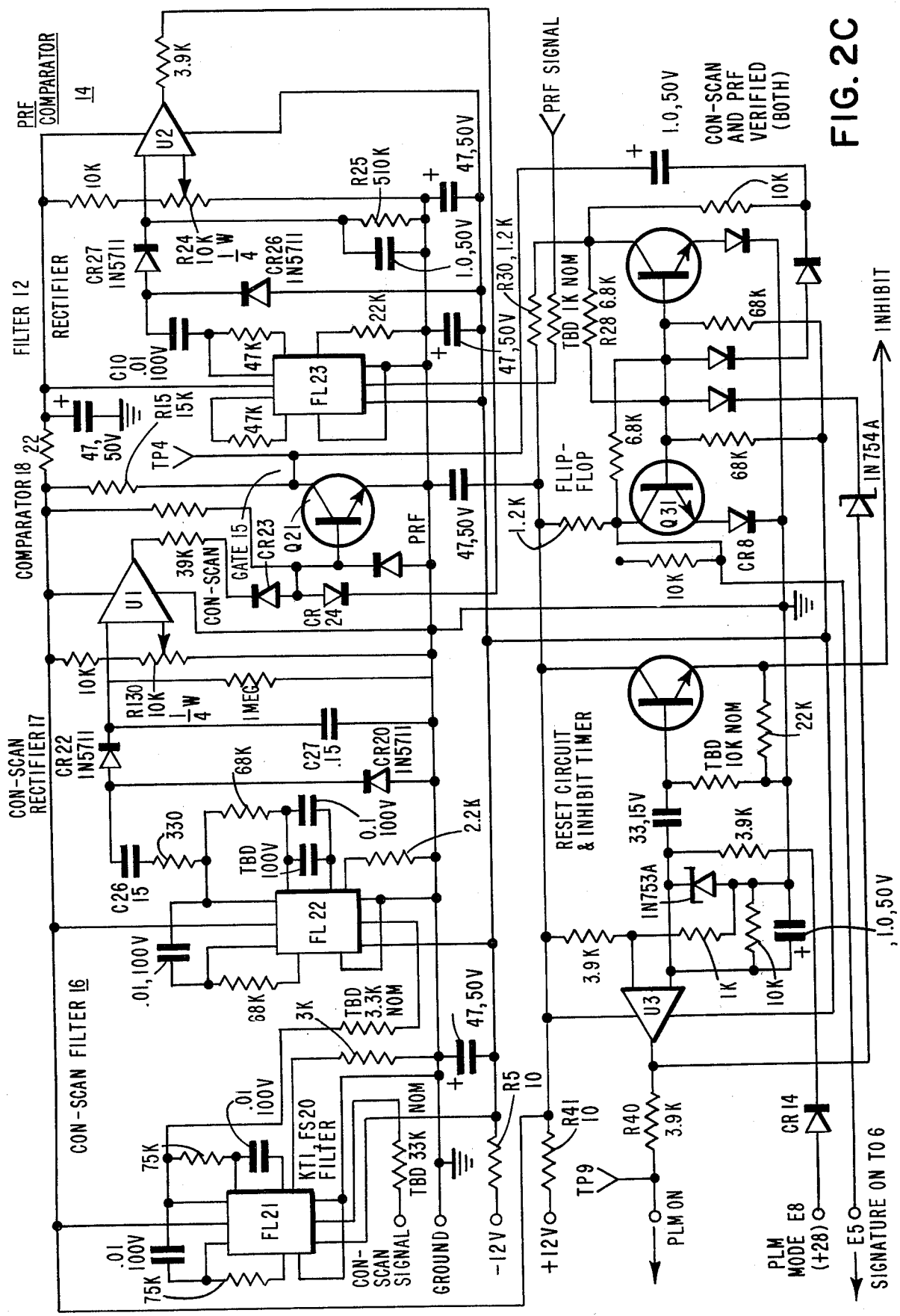

PRF Filter 12 and Rectifier 13 The PRF Filter 12 (FIG. 2C) is single stage active filter (microcircuit FL23 such as the FS-20 hybrid IC active filter of Kinetic Technology Incorporated) tuned for a pass band from 958 to 1186 pulses per second. The filter output is a sine wave equal in frequency to the input PRF. The gain is designed to provide a limited output with signal input 8 dB lower than the tracking capability of the radar. The sine wave output of the filter is rectified in a voltage doubler circuit consisting of C10, C22, CR27, and CR26. This discharge time of the circuit is determined by R25.

PRF Comparator 14 Microcircuit U2, a 741 operational amplifier is used as a level detector. The reference level on the inverting input is adjusted by R24. The dc output of the voltage doubler circuit is fed to the non-inverting input. The output of the PRF comparator is fed to one input of the NAND-gate 15.

Con-Scan Filter 16 and Rectifier 17 This filter detects the modulation on the return radar pulse caused by the rotating con-scan antenna. The filter consists of a two-stage hybrid active filter FL21 and FL22 similar to that used on the prf filter. The bandpass of the filter is from 52 to 68 Hz. The filter output is a sine wave equal to the con-scan frequency and the amplitude of the sine wave output is equal to the percentage of modulation on the received radar signal. The gain is set to be limited with a 10 percent modulation of the minimum input pulse that the radar is capable of tracking. A low Q first stage is used to reduce the transient response and ringing of the filter. The output of the con-scan filter is rectified in a voltage circuit consisting of C26, CR20, CR22, and C27.

Con-Scan Comparator 18 The output from the con-scan is level detected in the Comparator microcircuit U1, a conventional operational amplifier. The reference level is adjusted by R130. The output is fed to the remaining input of the NAND-gate 15.

NAND Gate 15 consists of CR23, CR24, and transistor Q21. A positive level on both inputs, one from the PRF comparator and the other from the Con-Scan comparator allows Q21 to be biased ON. The collector is connected to one side of the flip-flop.

Flip-Flop 19 and Reset Circuit 20 For isolation purposes the ∞volts (PLM ON) from the Radar Control used to activate the Target Acquisition Discriminator is coupled and inverted through an Operational Amplifier microcircuit U3, a conventional operational amplifier. Without ∞volts from the PLM control, the output of microcircuit is 8 volts negative. This holds Q31 of the flip-flop OFF. It is also connected through R40 of the Control Gate Relay 6.

With the PLM voltage ON the flip-flop is reset and will be set with a positive output from the PRF, con-scan NAND gate.

Figure 2D:
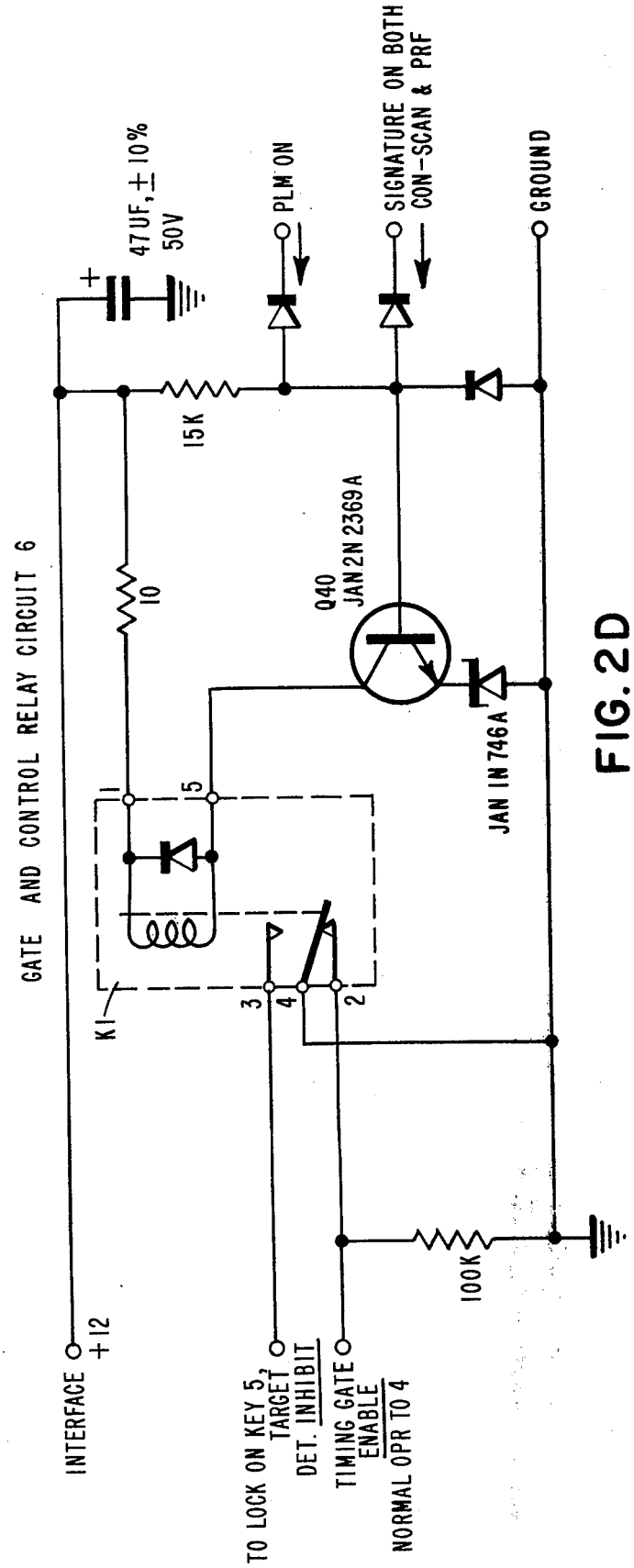

Gate and Control Relay Circuit 6, FIG. 2D The interface Circuit is designed to prevent the Radar from locking on a target in the PLM mode, unless conical scan modulation is detected on the return pulse and the PRF of the return pulse is within the pre-set pass band.

In normal operation, with PLM OFF, the output of the Radar Target Detector is removed from ground and the cathode of the timing gate is grounded through the single pole throw contact of relay K1.

In the PLM mode, relay K1 is energized and the output of the Target Detector is grounded denying information to the Radar lock up circuitry. Also the cathode of the timing gate is removed from ground, allowing the timing gate to continue running.

When the correct PRF with con-scan modulation is detected E4 is grounded removing the bias from Q40 and de-energizing K1. This returns the Radar to normal operation.

The above described preferred embodiment is subject to certain modifications which nevertheless fall within the scope of the claimed invention. Thus, the radar system may employ, instead of a conical scan antenna, a beam switched antenna; in the filter circuits, the known frequency characteristics would then be equated to the beam switching frequency. In another alternative embodiment, the acquisition circuit may be located on a missile air frame, the range gate search and track functions being replaced by speedgate search and track functions. The automatic range sweep and track lock on circuits are replaced by automatic frequency sweep and velocity speedgate lock on circuits, whereby the speedgate is caused to lock on to video return of a specific frequency modulation in lieu of range. What is described and shown in the attached drawings is the preferred embodiment of the invention. The true scope of the invention is intended to be limited only by the scope of the appended claims.

We claim:

1. A method for acquiring a target utilizing a conical scan radar system having a scan of a known pulse repetition frequency and a known scan frequency comprising directing the conical scan beam of said radar toward said target, setting a gate control relay to inhibit a track gate of said radar from locking onto a return signal prior to resetting, gating amplitude modulated video return signals from said target into a filter and comparator circuit, filtering the known conical scan frequency of said video return signal, comparing the conical scan filter output amplitude modulated signal to a known threshold, and resetting said control gate in response to said amplitude modulated scan frequency signal exceeding said known threshold to activate said radar track gate, thereby allowing said track gate to lock on said target.

2. The method as claimed in claim 1 further including the steps of filtering the known pulse repetition frequency of said video return signal in a path parallel to the filtering of the scan frequency, comparing the amplitude modulated pulse repetition frequency filter output to a known threshold,
   applying the result of said comparison to a coincidence gate having as its other input the result of said conical scan comparison, said control relay being reset by coincidence of conical scan filtered signal and said pulse repetition frequency filtered signal exceeding the appropriate known thresholds.

3. The method as claimed in claim 2 wherein said video return gating step includes forming a filter acquisition control pulse in response to a gate pulse normally applied to said inhibited track gate, and controlling the input to said filter and comparator circuit in accordance with said filter control pulse said filter acquisition pulse straddling said normal gate pulse in time so that said track gate may lock on targets entering or leaving the conical scan.

4. The method of claim 2 wherein said radar track gate is initially operative and said filter and comparator circuit is initially inhibited and including the step of manually initiating a target acquisition mode when said target is located within said scanning beam, thereby rendering said filter and comparator circuit operative and inhibiting said track gate.

5. The method as claimed in claim 1 wherein said video return gating step includes forming a filter acquisition control pulse in response to a gate pulse normally applied to said inhibited acquisition gate, and controlling the input to said filter and comparator circuit in accordance with said filter control pulse, said filter acquisition pulse straddling said normal gate pulse in time so that said track gate may lock on targets entering or leaving the conical scan.

6. A target acquisition system for use in combination with a conical scan radar system transmitting signals at a known pulse repetition frequency, the radar scanning a moving target at a preestablished scan frequency, comprising
   a radar receiver receiving reflected amplitude modulated signals from said moving target, gate means for sequentially sampling said reflected signals, an acquisition filter coupled to said gate means including means for filtering a signal of known frequency from said sampled signal and for comparing the amplitude modulation of said sequentially sampled and filtered signal to a predetermined threshold, and control relay means controlling a radar target track gate and activated in response to said comparing means detecting an amplitude modulated signal in excess of said threshold for activating said target track gate to lock on a target from which said amplitude modulated signals are reflected.

7. A target acquisition system as claimed in claim 6 wherein said acquisition circuit filter means includes a first filter for receiving said sampled signals having a pass band including the scan frequency of said radar device and said comprising means includes a first comparator for comparing the amplitude modulation of the sampled signal output of said filter with a predetermined threshold for thereby discriminating between random and sinusoidal amplitude modulation in the video return within said pass band of said filter.

8. A target acquisition system as claimed in claim 7 wherein said acquisition circuit filter means further includes a second filter for receiving said sampled reflected signals having a pass band including the pulse repetition frequency of said radar system and said comparing means a second comparator for comparing the amplitude modulation of said second filter sampled signal output with a predetermined threshold,
   and wherein said control relay means includes a coincidence gate responsive to the outputs of said first and second comparators indicating said sampled received signals include amplitude modulation in excess of said predetermined thresholds for activating said target track gate.

9. A target acquisition system as claimed in claim 8 wherein said sequential sampling gate means includes a gate pulse circuit interposed between said receiver and said comparing means for establishing a time envelope within which said comparing means receives said amplitude modulated signal, said gate pulse circuit being responsive to each pulse from a pulse source normally providing pulses to said target track gate to establish a stretched pulse envelope straddling said target gate pulse so that said comparing means are responsive to reflected signals from targets moving through said radar scan and said target track gate is enabled to lock on the target moving through the scan.

10. A system as claimed in claim 10 including a two-state control gate relay circuit coupled between said coincidence gate and said acquisition circuit for controlling the state of said acquisition circuit, manually operable means for initiating said target acquisition system coupled to said control gate relay and said gate pulse circuit for initiating operation of said gate pulse circuit to provide sampled signals to said acquisition circuit and for placing said control relay circuit and thereby said target track gate circuit in a non-operative state whereby said coincidence gate is responsive to said comparator means outputs to reset said control gate relay.

11. A system as claimed in claim 10 wherein said radar system includes a beam switch antenna, and said conical scan rate is said beam switching frequency.

12. A target acquisition system as claimed in claim 6 wherein said sequential sampling gate means includes a gate pulse circuit interposed between said receiver and said comparing means for establishing a time envelope within which said comparing means receives said amplitude modulated signal, said gate pulse circuit being responsive to each pulse from a pulse source normally providing pulses to said target track gate to establish a stretched pulse envelope straddling said target gate pulse to that said comparing means are responsive to reflected signals from targets moving through said radar scan and said target track gate is enabled to lock on the target moving through the scan.

13. A system as claimed in claim 12 wherein said control relay means includes a two-state control gate relay circuit coupled between said comparing means and said target track circuit for controlling the state of said target track circuit, and manually operable means for initiating the target acquisition system coupled so said control gate relay and said gate pulse circuit for initiating operation of said gate pulse circuit to provide sampled signals to said acquisition circuit and for placing said relay circuit and thereby said target track gate circuit in a non-operative state.

* * * * *